United States Patent
Bronstein et al.

(10) Patent No.: US 8,489,717 B2
(45) Date of Patent: Jul. 16, 2013

(54) ACCELERATED CABLE MODEM RESTART SERVICE

(75) Inventors: Vladimir Bronstein, Los Altos, CA (US); James Chen, Fremont, CA (US); Xiaogang Zhu, San Jose, CA (US); Tienchuan Ko, Saratoga, CA (US)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 12/566,581

(22) Filed: Sep. 24, 2009

(65) Prior Publication Data

US 2011/0072119 A1 Mar. 24, 2011

(51) Int. Cl.
*G06F 15/177* (2006.01)

(52) U.S. Cl.
USPC .............................. 709/222; 709/225; 398/45

(58) Field of Classification Search
USPC ......................................................... 709/222
See application file for complete search history.

(56) References Cited

U.S. PATENT DOCUMENTS

| | | | |
|---|---|---|---|
| 6,598,057 B1 * | 7/2003 | Synnestvedt et al. | 1/1 |
| 6,871,232 B2 * | 3/2005 | Curie et al. | 709/225 |
| 2003/0070063 A1 * | 4/2003 | Boyle et al. | 713/2 |
| 2009/0044240 A1 | 2/2009 | Sniezko et al. | |

OTHER PUBLICATIONS

Cadant C4 CMTS Cable Modem Termnation System: C4 CMTS User Documentation, ARRIS, Jul. 2005, ARRIS, all pages.*

* cited by examiner

Primary Examiner — Hua Fan
(74) Attorney, Agent, or Firm — Volpe and Koenig, P.C.

(57) ABSTRACT

A system for the accelerated re-provisioning of data over cable service interface specification (DOCSIS) configuration files between a DOCSIS provisioning server and a plurality of network nodes that are configured according to the DOCSIS configuration files is provided. The system includes: a memory; and a caching entity configured to monitor transmissions from the provisioning server of the configuration files to the network nodes so as to both store the configurations files in the memory and to pass-through the configuration files to the network nodes; the caching entity being further configured to monitor requests to the provisioning server for respective ones of the DOCSIS configuration files from the network nodes, the caching entity being further configured to determine for each of the requests whether the requested configuration file has been previously requested node such that if the caching entity determines that the requested configuration file has been previously requested the caching entity retrieves the previously requested configuration file from the memory and returns the retrieved-from-memory configuration file to the network node.

5 Claims, 5 Drawing Sheets

ACCELERATED CABLE MODEM RESTART SERVICE

TECHNICAL FIELD

This application relates to network management and more specifically to the adaptation of data over cable service interface specification (DOCSIS) network management systems to accelerate the re-provisioning of a configuration file.

BACKGROUND

A consortium known as Data Over Cable Service Interface System (DOCSIS) has promulgated the DOCSIS standard for cable systems since the mid-1990's. A vendor that wanted to provide cable modems (CMs) or cable modem termination systems (CMTS's) would first have to get their designs certified through the DOCSIS consortium, whereupon they could sell to the multiple system operators (MSOs) or their customers. The resulting efficiency and cost savings combined with the already extensive and massive reach of the MSOs' networks made DOCSIS CMs the dominant way for U.S. users to access the Internet.

As technology has continued to evolve since the inception of DOCSIS, DOCSIS itself has evolved in turn such that various enhancements have been standardized. For example, DOCSIS 1.0 evolved to DOCSIS 1.1, then DOCSIS 2.0, and finally DOCSIS 3.0. But all these more modern flavors of DOCSIS maintain backwards compatibility with previous versions. Thus, DOCSIS has continued to dominant the market for broadband access despite the evolution of telecommunication alternatives such as DSL.

Each DOCSIS version specifies the protocol used for management of the network elements. Part of this management includes provisioning each cable modem with a configuration file. Each cable modem (CM) is configured to acquire its configuration file subsequent to power-up. In this manner, an MSO can monitor and control the way a CM accesses the network. But consider the aftermath of a extensive power failure: it is common that power is suddenly re-supplied to entire neighborhoods or even large cities such that a large number of CMs are simultaneously powered-up and thus request for their configuration file. A server in the DOCSIS management system that provides the configuration files responsive to these requests thus becomes overburdened and crashes, whereupon it may take several more hours to finally re-provision all the cable modems. This delay will not just occur for a cable network: should a passive optical network (PON) be managed using DOCSIS management tools, the same delay will be incurred upon mass startup of the CM analogs (optical network units).

Accordingly, there is a need in the art for an accelerated DOCSIS re-provisioning of configuration files that will not suffer the bottlenecks and delay encountered in conventional DOCSIS systems subsequent to power failure re-boots.

SUMMARY

In accordance with a first aspect of the disclosure, a system for the accelerated re-provisioning of data over cable service interface specification (DOCSIS) configuration files between a DOCSIS provisioning server and a plurality of network nodes that are configured according to the DOCSIS configuration files is provided. The system includes: a memory; and a caching entity configured to monitor transmissions from the provisioning server of the configuration files to the network nodes so as to both store the configurations files in the memory and to pass-through the configuration files to the network nodes; the caching entity being further configured to monitor requests to the provisioning server for respective ones of the DOCSIS configuration files from the network nodes, the caching entity being further configured to determine for each of the requests whether the requested configuration file has been previously requested by a network node such that if the caching entity determines that the requested configuration file has been previously requested the caching entity retrieves the previously requested configuration file from the memory and returns the retrieved-from-memory configuration file to the network node.

In accordance with another aspect of the invention, a system for the accelerated re-provisioning of data over cable service interface specification (DOCSIS) configuration files between a DOCSIS provisioning server and a DOCSIS proxy server that communicates resulting configuration data to a plurality of optical network units (ONUs) is provided. The system includes a memory; and a caching entity configured to monitor transmissions from the provisioning server of the configuration files to the DOCSIS proxy server so as to both decode the configuration files and to store resulting decoded configuration data in the memory; the caching entity being further configured to monitor requests from the ONUs to an optical line terminal (OLT) for registration, the caching entity being further configured to determine for each of the registration requests whether a corresponding ONU has been previously registered such that if the caching entity determines that the ONU has been previously registered, the caching entity retrieves decoded configuration data from the memory and re-configures the ONU accordingly.

In accordance with another aspect of the invention, a method of provisioning and re-provisioning an optical network unit (ONU) using configuration data decoded by a data over cable service interface specification (DOCSIS) proxy server from a configuration file received from DOCSIS provisioning server is provided. The method includes: requesting an initial registration of an ONU with an optical line terminal (OLT); responsive to the initial registration request, transmitting from the proxy server to the provisioning server a request for a corresponding configuration file; decoding the corresponding configuration file to produce configuration data to configure the ONU; storing the configuration data; and configuring the ONU according to the configuration data.

DETAILED DESCRIPTION

An accelerated DOCSIS configuration file provisioning system is disclosed to address the bottlenecks and delays discussed previously with respect to conventional DOCSIS recovery techniques. This acceleration is discussed with regard to a DOCSIS proxy architecture that enables DOCSIS network management tools to manage PON network nodes in a scalable and efficient manner However, it will be appreciated that this DOCSIS acceleration is readily applied to conventional cable networks as well. The DOCSIS proxy architecture may be better understood with regard to the following discussion of DOCSIS network management.

DOCSIS Management Architecture

Figure 1:
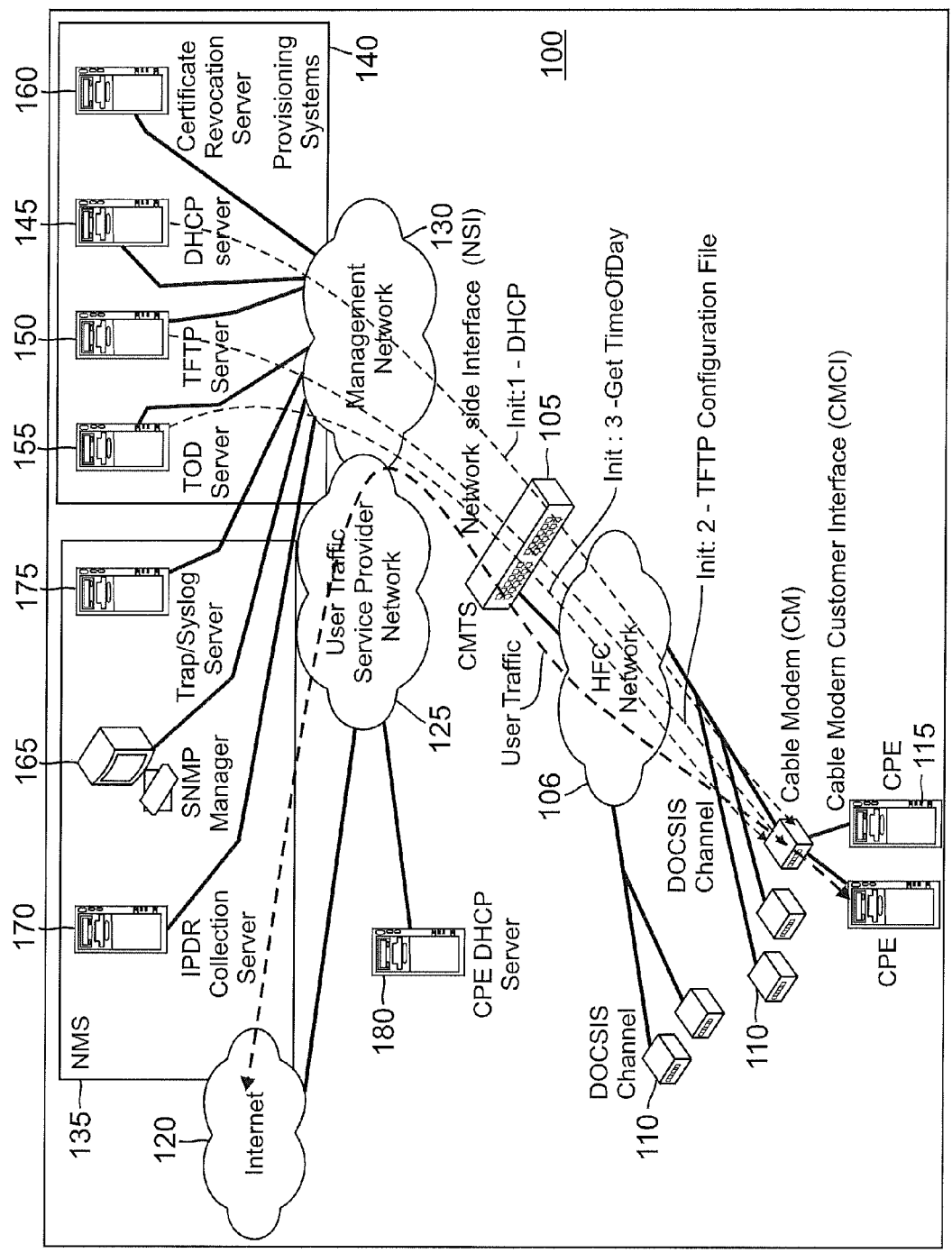
FIG. 1 illustrates a DOCSIS management architecture for a coaxial cable network.

A DOCSIS management architecture 100 is shown in FIG. 1. A DOCSIS network local loop exists between a cable modem termination system (CMTS) 105 and a plurality of cable modems (CMs) 110. Each CM may couple one or more Customer Premises Equipment (CPE) such as PCs 115 to an external network such as Internet 120. A user traffic service provider network 125 serviced by the MSO controlling the DOCSIS management couples user data traffic to and from the Internet through a service provider router (not illustrated) so that the CMs operate as if they were a node on the Internet.

But the CMs also sit as nodes on a management network 130 that is transparent to the CPE users. It is through this management network that the DOCSIS network management tools configure and manage the CMTS and its CMs. It will be appreciated that architecture 100 includes one CMTS for illustration clarity only—indeed, it is customary that multiple CMTS and their CMs are managed through the management network.

The DOCSIS management performed through the management network may be classified into two major areas: provisioning and monitoring. To make the terminology a bit more challenging, it is conventional in DOCSIS to also refer to the monitoring prong of DOCSIS management as the network management system (NMS). To keep the distinctions clear between DOCSIS management, which includes the provisioning and monitoring prongs, the monitoring tools within architecture 100 will be referred to as an NMS 135 whereas the provisioning tools are collectively referred to as a provisioning system 140.

DOCSIS provisioning through provisioning system 140 involves the configuration of the network elements (each CMTS and its CMs) to receive network services. The network elements themselves take an active part in provisioning. For example, each CM goes through a boot-up provisioning process upon power-up and establishing an initial communication channel through the CMTS. To perform this active role in provisioning at boot-up, each CM accesses a DHCP server 145 in the provisioning system to obtain initial configuration information such as the IP address of a TFTP server 150 in the provisioning system and the name of a corresponding configuration file on this server. In this fashion, each CM may request its configuration file from the TFTP server. Having downloaded its configuration file, each CM decodes the DOCSIS information elements/encodings contained in this file and applies them to its own configuration. In addition, provisioning involves the CMs obtaining time of day (TOD) information from a TOD server 155 in the provisioning system. The resulting data flows are shown in FIG. 1. For example, a path denoted as "Init:1" represents the transmission of the TFTP IP address and configuration file name from the DHCP server to a requesting CM. A path denoted as "Init:2" represents the transmission from the TFTP server to this CM of its configuration file. Finally, a path denoted as "Init:3" represents the transmission of the TOD from the TOD server to this CM. After the CM has configured itself and established a channel with the CMTS, it must be registered by the CMTS before it can access the Internet. Pursuant to this registration process, a certificate revocation server 160 in the provisioning system determines whether any CMs are revoked such that they are not allowed service.

After the configuration of the network elements occurs through the provisioning system, the NMS performs performance management and fault management using Simple Network Management Protocol (SNMP). Thus, each CM and CMTS is managed through corresponding Management Information Bases (MIBs) as known in the SNMP arts through an SMMP manager. Fault management may occur through SNMP traps or notification when events of interest happen in the network nodes (the CMs and their CMTSs). In addition, there are special status values in the network element's MIBs that may be interpreted as alarm conditions representing some type of fault. The network elements may also report faults through syslog messages collected by a trap/syslog server 175. As implied by the name, server 175 may also collect SNMP traps. Should the NMS system be implemented in a DOCSIS 3.0 compliant network, additional fault monitoring capability occurs through an Internet Protocol Data Record (IPDR) server 170. It will be appreciated that the various elements in the management network system and the provisioning system are illustrated as separate elements simply because they represent separate functional elements: for example, the DHCP server and the TFTP server may be co-located in a single computer as may the other provisioning and NMS elements.

The management network and the user traffic service provider network are two separate IP networks although they may be overlaid with each other over common physical interfaces to the various entities that couple to both networks. The IP addresses on the management network are typically private since they are assigned by the DOCSIS network operator. In contrast, the user traffic network IP addresses are usually public IP addresses selected from a block of available addresses assigned by the MSO to the CPEs, a CPE DHCP server 180, and also the MSO's routers (not illustrated). The upstream interface for the CMTS is designated as a network side interface (NSI) whereas the interface between the CPEs and their CMs is designated as the cable modem customer interface (CMCI). The customer and management traffic downstream from the NSI interface is combined but upstream of the NSI, they are separated into the user traffic service provider network and the management network as illustrated in FIG. 1.

The DOCSIS Proxy for PON

A PON such as EPON differs significantly from the DOCSIS network discussed with regard to FIG. 1. For example, a CM has an IP address on the management network and runs an SNMP agent on this address. But an EPON optical network unit (ONU), which may be analogized broadly to a CM modified to communicate in the upstream direction using an optical fiber instead of a coaxial cable, has no IP address. Moreover, it may be expensive and inconvenient to modify existing ONU firmware to accommodate the DOCSIS SNMP agent. To enable the provisioning system and the NMS discussed with regard to FIG. 1 to manage a PON, a DOCSIS proxy is introduced between the PON and these DOCSIS operation system support (OSS) management tools. The following discussion is directed to the implementation of a DOCSIS proxy for an EPON but it will be appreciated that this example is readily adapted for other types of PONs such as GPON.

Figure 2:
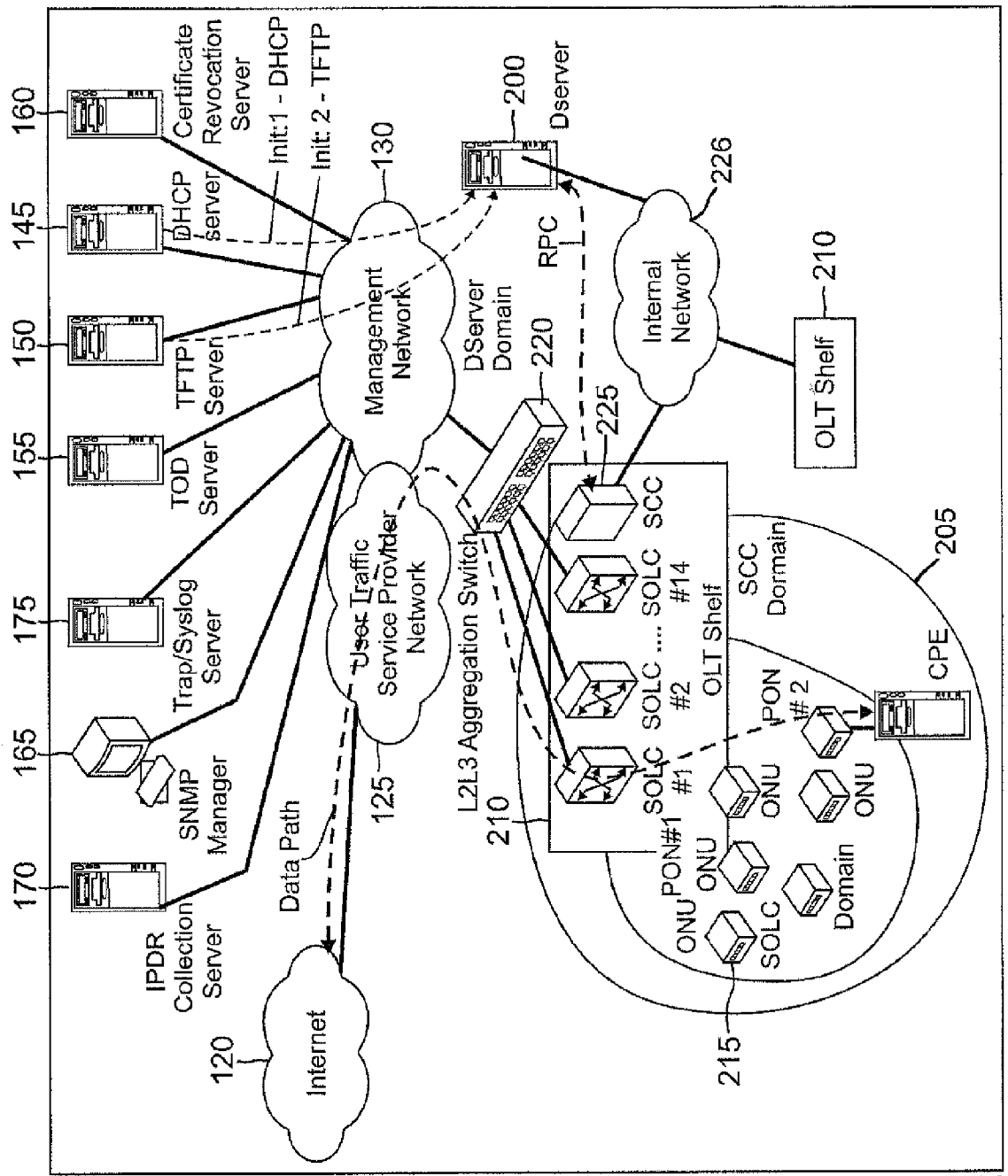
FIG. 2 illustrates a DOCSIS management architecture using a DOCSIS proxy to manage a PON.

Turning now to FIG. 2, a DOCSIS proxy 200 is introduced between an EPON 205 and the DOCSIS management elements discussed with regard to FIG. 1. The ONU elements include an OLT shelf 210 that functions as multiple OLTs as discussed further. As used herein, a single OLT refers to that structure and its associated functionality to support the 1 Gigabit transmission rate (both upstream and downstream)

with its associated ONUs. Because an EPON is passive, there is only a certain maximum number of ONUs that may be serviced by any given OLT in that additional passive splitting of the downstream signal from the OLT will degrade the signal such that the ONUs are unable to decode it. But regardless of the upper limit of ONUs accommodated by any given OLT, it may be seen that shelf 210 can thus support a relatively large number of ONUs depending on the total number of OLTs the shelf is configured to represent. To emulate the high-capacity single NSI interface from a CMTS, the various OLTs configured within shelf 210 couple through an aggregation switch 220 to provide data traffic to the user traffic service provider network. Aggregation switch 220 may also couple to the management network for transmission of DOCSIS management information. Switch 220 may be a layer 2 (L2) switch (bridge) or an L2/layer 3 (L3) switch/router. In that regard, switch 220 may comprise a multiple hierarchy of aggregation devices, in which a lower level comprises L2 switches whereas the higher levels comprise an L3 switch/router.

Despite the number of OLT shelves being supported by the DOCSIS proxy, on a logical level they may all be represented as a single CMTS. Of course, on a physical level, each OLT shelf is represented as a single entity. Thus, the DOCSIS proxy effectively hides the complexity of multiple OLT shelves from the DOSCIS management tools since they all constructively appear as one CMTS to these tools. The coupling of the aggregation switch to the management network allows an operator to directly control the switch. However, in an alternative embodiment, the aggregation switch may be coupled to an internal network 226 that the DOCSIS proxy uses to control the various EPON network elements such as the OLT shelf. In this fashion, the aggregation switch would no longer be directly accessible through the management network as are the remaining EPON elements. Thus EPON 205 may be considered to be within a DOCSIS proxy domain whose management is not directly accessible through the management network.

In one embodiment, the OLT shelf is configurable with multiple system optical line cards (SOLCs). For example, OLT shelf 210 may accommodate up to fourteen such cards, ranging from an SOLC #1 to an SOLC #14. Each SOLC may include two OLT interfaces for downstream traffic and two Gigabit-Ethernet (GigE) interfaces for the NSI side. A system controller card (SCC) 225 acts as a shelf manager and couples to the internal network controlled by the DOCSIS proxy. Thus management and data traffic at the NSI is thus segregated in this fashion.

The functionalities discussed herein for the DOCIS proxy may be distributed such as within the OLT shelf but a discrete and separate location such as a workstation for the DOCSIS proxy as opposed to an embedded location offers some advantages in that the existing firmware for EPON devices may be left unaltered. Moreover, a workstation has fewer processor and memory constraints than embedded devices. In addition, by keeping the DOCSIS proxy as a discrete device, the resulting solution is advantageously scalable: the addition of multiple OLT shelves is readily accommodated by the discrete DOCSIS proxy. Furthermore, such a location for the DOCSIS proxy enables it to perform IP address management for the SCCs, which simplifies large deployments. Finally, a discrete location for the DOCSIS proxy makes the translation of multiple OLT shelves to emulate one large CMTS very efficient. Although such a discrete location offers these advantages, some embodiments may desire an embedded and/or distributed implementation of the DOCSIS proxy to minimize the vulnerability to the failure of a single hardware unit. Thus, it will be appreciated that the DOCSIS proxy may be implemented and located as desired—it need not be a discrete proxy in a stand-alone platform such as a workstation. The remaining discussion will thus assume that the DOCSIS proxy is a stand-alone device without loss of generality.

Figure 3:
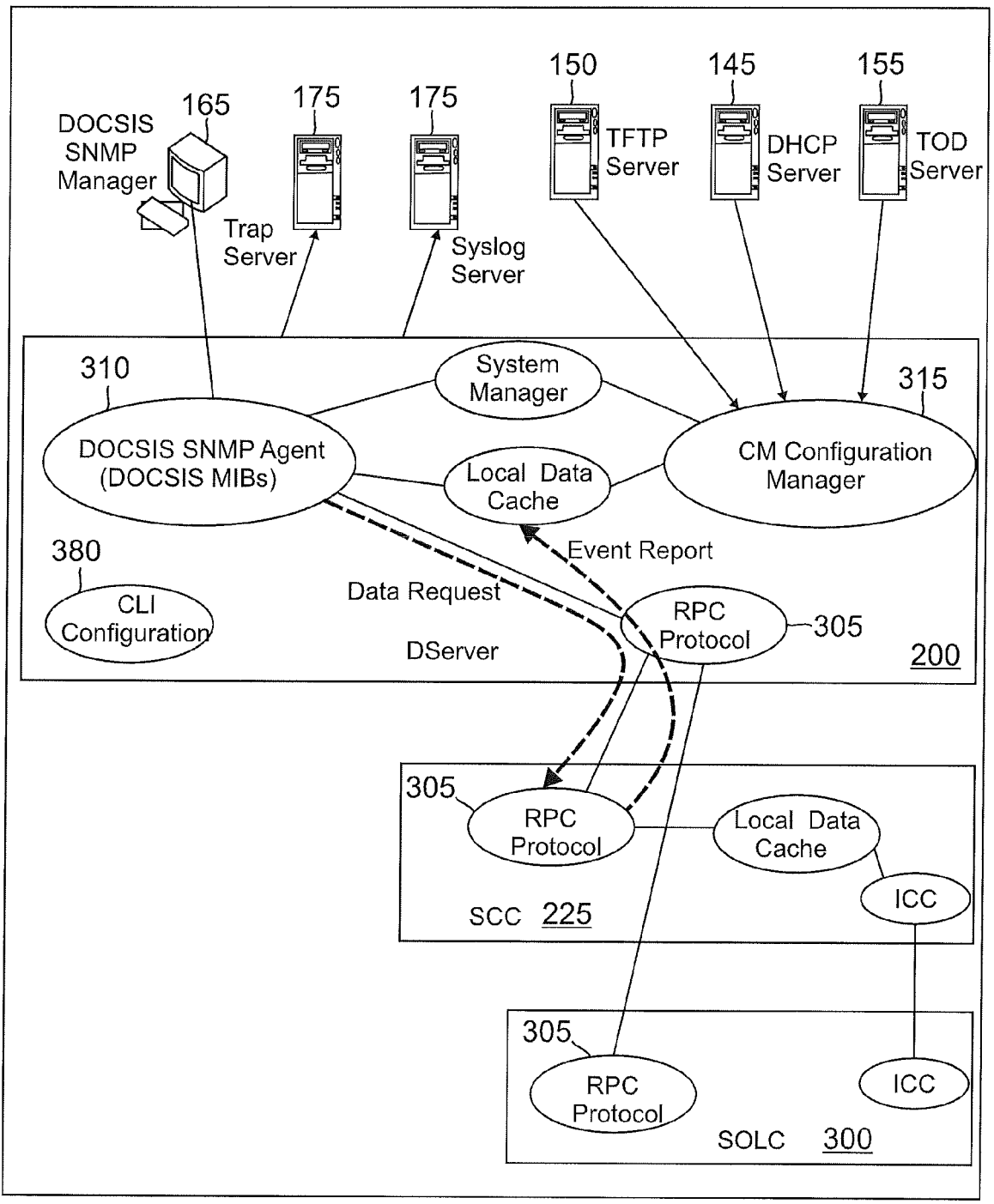
FIG. 3 is a block diagram illustrating software functionalities in the DOCSIS proxy and PON elements from FIG. 2.

Various software functionalities for an embodiment of DOCSIS proxy 200 are illustrated in FIG. 3. Because the proxy and SCC 225 have distinct processors with respect to each other, a convenient software protocol to allow the DOCSIS proxy to initiate some SCC-processor-implemented action in the SCC is the use of a Remote Procedure Call (RPC) protocol. In alternative embodiments, software analogs to an RPC protocol may be used to perform the same remote initiation. RPC protocol also allows the DOCSIS proxy to also control an SOLC 300 through the SCC. Thus, the DOCSIS proxy as well as the SCC and the SOLC include an RPC software functionality module 305. This RPC protocol is built on top of whatever Inter Card Communication (ICC) protocol that enabled the SCC and the SOLC to communicate. Communication between these cards and the ONUs may remain within this ICC protocol without requiring use of an additional RPC protocol. Each of the elements shown in FIG. 3 includes a local data cache to enable, for example, the quick and easy access of data as well as global sorting or indexing of data.

As discussed previously, the DOCSIS proxy functions such that the ONUs appear as CMs to the DOCSIS management tools. But CMs have SNMP agents and associated MIBs whereas an ONU does not. To avoid a possibly undesirable modification of existing ONU firmware to accommodate this SNMP agent, the proxy may include a DOCSIS SNMP agent proxy 310 that emulates the ONU SNMP agents as well as their associated MIBs. An ONU SNMP agent provides generic access responsive to the passive side of the SNMP protocol: SET/GET request reception, SET/GET response generation, and TRAP generation. Agent proxy 310 registers software hooks for the MIB objects of interest such as scalar variables, tables, etc. at run-time or by statistically generated code. Thus, when a request arrives at agent proxy 310 via the SNMP protocol from SNMP manager 165 for a GET or a SET action with regards to a particular MIB object—the software hook is being called with additional parameters specifying what value is to be set, etc. Agent proxy 310 must also emulate the trap generation that would otherwise be performed by the ONUs. This trap generation may occur through an API that formats the appropriate variables to be sent with the trap and also formats the trap itself.

The agent proxy faces a problem in that, in general, it is well known to introduce an SNMP agent proxy for managing a collection of non-SNMP elements. For example, commercially available SNMP agent proxies are available for the management of non-SNMP network nodes. To enable this management, a conventional SNMP agent proxy includes a customized MIB. For example, the customized MIB may include multiple instances at each MIB variable. Thus, suppose one multiple-instance MIB variable represents the temperature of each non-SNMP network node. Each instance thus corresponds uniquely to a given node. The SNMP manager for these nodes would thus be informed of this correspondence so it can correlate any given MIB instance with the appropriate network node. But such a customized MIB in unavailable for the DOCSIS proxy since the network management tools would thus also have to be re-configured with this customized MIB. In that regard, the MIB for a DOCSIS CM has no means within it to tie it to its CM because there was no need for such a capability: the CM included an SNMP agent that knew what its IP address was and so the CM MIB need not include anything further to tie it to this IP address.

SNMP agent proxy 310 must thus manage multiple instances of MIBs, where each MIB corresponds uniquely to an associated identity (the IP address used in the DOCSIS management system to manage the associated CM) but lacks any means within the MIB to indicate this correspondence. To enable this correspondence, proxy 310 includes a database that associates with the necessary MIBs. Because each CM MIB has the same tree structure, each variable in the MIB may be mapped to a corresponding array in the database. This mapping array has one or more dimensions corresponding to the variable instances across the MIBs—if the variable is a scalar, this would require just one dimension whereas if the variable is a row, the vector would require two dimensions dedicated to the corresponding two scalar values for each value in the row, and so on. But there is another dimension in this mapping array that corresponds to an "AgentID" array index. This index maps to each ONU in pre-determined fashion. For example, suppose the MIB variable was a scalar variable denoted as "SysName." The mapping array would then be a one-dimensional row (or column) having values identified as "Sysname[agentID]."

In general, proxy 310 will be configured with multiple IP addresses, where each IP address represents the IP address of a simulated agent for a given ONU. Proxy 310 will thus store a mapping that uniquely maps the AgentID values to the IP address. The proxy 310 may then monitor the appropriate port number (a standard port number is 161 in UDP) at all these IP addresses. The combination of the port number and the IP address constitutes a unique Internet socket. Thus, when proxy 310 receives an SNMP PDU at a given one of these sockets, it may retrieve the corresponding IF address for this socket—this is not a function supported by conventional SNMP engines and so would require a modification of such an engine to perform this retrieval act. The software process initiated by the receipt at this socket continues by associating this retrieved IP address with the corresponding AgentID so that it may be written into a local thread variable. Control may then be returned to the SNMP engine to further decode the PDU and call an appropriate MIB handling function. This MIB handling function may then read the current AgentID from the thread variable. By processing this AgentID through the stored mapping, the MIB handling function identifies the corresponding IP address so that this IP address can be checked to see if this MIB object should be available on the specific agent. Assuming that the MIB object is available, the MIB handling function accesses the corresponding instance in the array responsive to the PDU decoding and the AgentID index.

Figure 4:
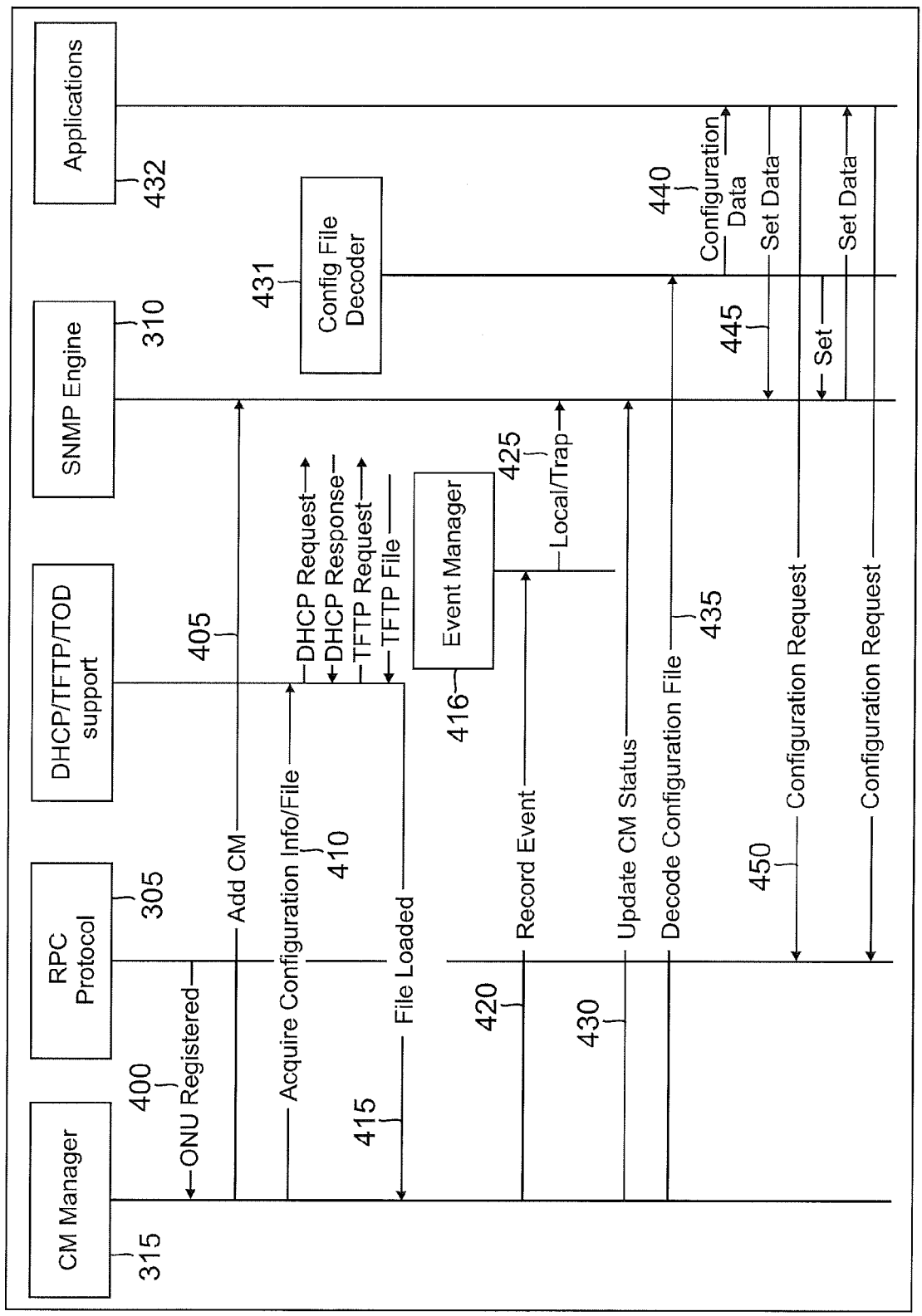
FIG. 4 is a process flow diagram illustrating the software interactions for emulating a CM provisioning for an ONU.

The DOCSIS proxy must also emulate the necessary DOCSIS provisioning in addition to the SNMP NMS management as just described through the SNMP agent proxy. An example process by which a CM configuration manager such as manager 315 of FIG. 3 emulates this provisioning is shown in FIG. 4. This process begins when an ONU is initially registered to its OLT. A report of this registration transfers from the ONU to the SCC card using an appropriate protocol such as ICC. In response, the SCC card issues an RPC request 400 to the DOCSIS proxy CM manager to report this ONU registration. The CM manager may then call the SNMP engine within the SNMP agent proxy to create a new entry for this new constructive "CM" through act 405 (in reality, this new "CMU" is the ONU just registered at the OLT). The subsequent acts in FIG. 4 would also be associated with an update to the SNMP engine in this fashion but are not illustrated for clarity. As discussed previously, the provisioning of a CM involves the CM requesting the TFTP address and a configuration file name from the provisioning system's DHCP server and then obtaining the configuration file from the TFTP server. The CM manager commands these provisioning steps as represented by the acquire configuration information command 410—this is represented as a single command for illustration clarity. The successful loading of the configuration file into the software module configured for the necessary DHCP/TFTP/TOD support is reported through act 415. The CM manager may then instruct an event manager to record this successful loading event through command 420 whereupon the event manager may record this result using a trap 425 from the SNMP engine. Alternatively (or in addition), the CM may command the SNMP engine to update the CM status with a command 430. The CM may then command a configuration file decoder software module to decode the configuration file with a command 435. The resulting configuration data flow 440 to appropriate applications enter the corresponding data into the MIBs using a SET command 445 issued to the SNMP engine. In response, the applications transfer the configuration data using a configuration request 450 to the SCC's RPC protocol engine. Additional set commands and associated configuration requests complete the provisioning of this newly-added CM. It will be appreciated that the software flow discussed with regard to FIG. 4 is merely one possible instantiation in that such a provisioning could be effectuated in numerous alternative fashions.

The time necessary for the transmission of the configuration file from the TFTP server subsequent to act 410, decoding the configuration file, and applying the resulting configuration through RPC messages to the SCC, which in turn configures the ONU as necessary though ICC messages, may take several seconds. Moreover, the configuration of several ONUs on the same OLT shelf cannot be performed in parallel but instead must be performed sequentially. And this delay is of course exacerbated in the case of a mass power failure and the subsequent provisioning requests by numerous ONUs in parallel.

To accelerate this provisioning process, the fact that a given configuration file will not likely have changed after an ONU is powered down and then re-booted is exploited. For example, the PON may store the CM configuration file on, for example, the SCC in a non-volatile memory. In this fashion, the DOCSIS proxy need not push the configuration file via RPC to the SCC again. One example accelerated process will occur as follows:

1. Upon power-up, each ONU registers with its OLT prior to the request for the configuration file. The OLT may then check if the same ONU (through its unique MAC address) was provisioned earlier. If it was, the ONU is immediately re-provisioned using the stored configuration file corresponding to this MAC address. This re-provisioning is done without checking for authentication (and hence, possible revocation). The SCC may then send an "ONU registered" event via RPC to the DOCSIS proxy with the ONU's identifying data such as MAC address as well as the index and timestamp of the last configuration change.

2. Upon receiving this event, the DOCSIS proxy may obtain the TFTP server IP address from the DHCP server as well as the name of the configuration file. Using this IP address and file name, the DOCSIS proxy obtains the corresponding configuration file as discussed earlier with regard to FIG. 4. If the DOCSIS proxy is unable to obtain this configuration file, the ONU is de-provisioned from the OLT.

3. In addition, the DOCSIS proxy may use the MAC address of the registered ONU to determine whether the ONU had been previously provisioned on a different EPON interface: same DOCSIS proxy but different OLT or PON port. Should this determination indicate the ONU had indeed been previously provisioned in this fashion, the ONU will be de-provisioned and the full (non-accelerated) re-provisioning process initiated.

4. Should step 3 indicate that ONU had not been so previously provisioned on a different EPON interface, the DOCSIS proxy compares the previous configuration file name to the file name retrieved in step 2. In addition, the DOCSIS proxy compares a message integrity code (MIC) from the previous configuration file to the current MIC. If both the names and MICs match, the accelerated configuration is confirmed. Otherwise, a full (non-accelerated) re-provisioning process is initiated.

Figure 5:
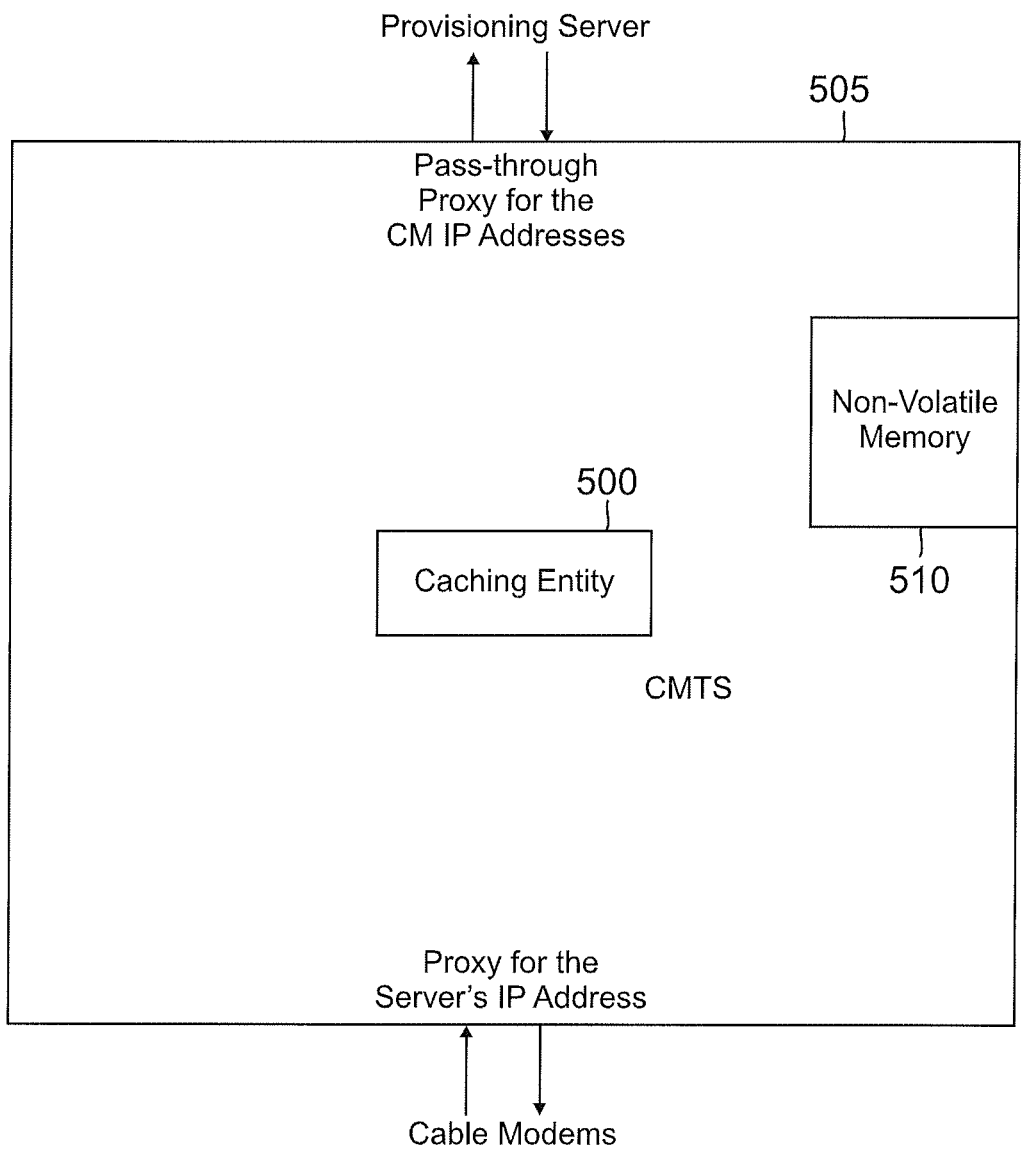
FIG. 5 is a block diagram of a cable modem termination system (CMTS) configured with a caching entity for accelerated re-provisioning of cable modems.

It will be appreciated that the foregoing accelerated re-provisioning in the context of a DOCSIS proxy is readily adapted to a cable network. For example, the CMTS or an alternative network node may be configured with a configuration caching entity 500 as shown in FIG. 5 for a CMTS 505. This entity is configured such that pursuant to an initial configuration of a CM, the entity receives the retrieved configuration file, stores it in memory, but also transmits the file to the CM. In that regard, the entity sits as a "pass-through" proxy for all the IP addresses corresponding to the CMs in that it must receive all messages sent to the CM's but such received messages are also transmitted to the CM. Although the configuration files destined for the CMs thus passes through the caching entity, the caching entity will also store the configuration files in a non-volatile memory 510. The presence of a stored configuration file for a given CM indicates to the entity whether the CM has been provisioned previously.

Should this CM then have to re-boot and request its configuration file from its TFTP server, the request is initially received by the entity. In that regard, the entity must also act as a proxy for the TFTP server's IP address. But the entity does not simply "pass-through" this request to the TFTP server. Instead, the entity determines whether the CM has been previously provisioned. If the CM has indeed been previously provisioned, the entity will immediately respond with the stored configuration file. In this fashion, the delay discussed above is avoided. To ensure proper configuration of only authorized CMs, the caching entity may then subsequently retrieve the configuration file from the TFTP server. As discussed previously, the entity may compare names and NICs for the previous configuration file and the current configuration file to determine if both match. If both match, the accelerated provision of the configuration file by the entity in response to the re-boot and request for a configuration file by the CM was appropriate, no further action need be taken. However, if either the name or NIC doesn't match, the entity will initiate a full (non-accelerated) re-provisioning by the CM.

Embodiments described above illustrate but do not limit the invention. It should also be understood that numerous modifications and variations are possible in accordance with the principles of the present invention. Accordingly, the scope of the invention is defined only by the following claims.

We claim:

1. A system for the accelerated re-provisioning of data over cable service interface specification (DOCSIS) configuration files between a DOCSIS provisioning server and a plurality of optical network units (ONUs), comprising:
    a memory;
    a DOCSIS proxy configured to emulate DOCSIS provisioning for the ONUs according to the DOCSIS configuration files such that each ONU emulates a corresponding cable modem, wherein the DOCSIS proxy is configured to respond to an initial registration request sent from a given one of the ONUs to an optical line terminal by requesting a DOCSIS configuration file from the provisioning server and to decode the DOCSIS configuration file into an ONU configuration file; and
    a caching entity configured to monitor transmissions from the provisioning server of to the ONUs so as to store the ONU configurations files in the memory and to pass-through the ONU configuration files to the ONUs; the caching entity being further configured to monitor requests to the provisioning server for respective ones of the ONU configuration files from the ONUs, the caching entity being further configured to determine for each of the requests whether the requested ONU configuration file has been previously requested such that upon determining by the caching entity that the requested ONU configuration file has been previously requested by a given one of the ONUs, the caching entity retrieves the previously requested ONU configuration file from the memory and returns the retrieved-from-memory ONU configuration file to the given ONU.

2. The system of claim 1, wherein the provisioning server is a trivial file transfer protocol (TFTP) server.

3. The system of claim 2, wherein the DOCSIS proxy is further configured to, subsequent to the provisioning of the given one of the ONUs, retrieve a corresponding DOCSIS configuration file from the TFTP server and compare the corresponding DOCSIS configuration file from the TFTP server to the retrieved-from-memory DOCSIS configuration file.

4. The system of claim 3, wherein the DOCSIS proxy is further configured to de-provision the given one of the ONUs if the comparison indicates the retrieved-from-memory DOCSIS configuration file differs from the requested file from the TFTP server.

5. The system of claim 3, wherein the comparison comprises comparing names for the compared files and comparing message integrity codes (MICs) for the compared files.

* * * * *